United States Patent [19]

Walmsley

[11] 3,909,378

[45] Sept. 30, 1975

[54] COMPOSITE CATION EXCHANGE MEMBRANE AND USE THEREOF IN ELECTROLYSIS OF AN ALKALI METAL HALIDE

[75] Inventor: Peter Newton Walmsley, Wilmington, Del.

[73] Assignee: E. I. Du Pont de Nemours and Company, Wilmington, Del.

[22] Filed: June 21, 1974

[21] Appl. No.: 481,751

[52] U.S. Cl. .................. 204/98; 204/128; 204/296; 117/62.1; 117/138.8 UF
[51] Int. Cl.² ... C25B 1/16; C25B 13/08; C25B 1/26
[58] Field of Search ............ 204/296, 128, 98, 252; 117/62.1, 138.8 UF

[56] References Cited
UNITED STATES PATENTS 3,692,569  9/1972  Grot ......................... 117/138.8 UF
3,784,399  1/1974  Grot ..................................... 117/68

Primary Examiner—R. L. Andrews

[57] ABSTRACT

A composite film of fluorinated cation exchange polymer containing sulfonyl groups in ion exchange form whereby one surface of the film to a depth no more than one-third of the film's thickness contains the polymer at an equivalent weight of at least 250 greater than the equivalent weight of the polymer comprising the remaining thickness of the film. The film may be employed in an electrolytic cell in the production of halogen and alkali metal hydroxide from an alkali metal halide. In the cell the film separates the anode and cathode compartments with the high equivalent weight polymer side facing the cathode portion of the cell.

16 Claims, No Drawings

COMPOSITE CATION EXCHANGE MEMBRANE AND USE THEREOF IN ELECTROLYSIS OF AN ALKALI METAL HALIDE

BACKGROUND OF THE INVENTION

Fluorinated ion exchange polymers are known in the art wherein sulfonyl groups in —$SO_2X$ form (X represents chlorine or fluorine) are reacted to an ion exchange group. These sulfonyl groups are converted to ion exchange form such as by hydrolysis with an alkaline material or by treatment with ammonia. An example of early teaching in the prior art is disclosed in Connolly & Gresham, U.S. Pat. No. 3,282,875.

The use of ion exchange polymers in a nonuniform structure is known. In Grot U.S. Pat. No. 3,692,569 is disclosed surface active copolymer coatings whereby the surface is ionically conductive. A preferred embodiment of the patent discloses an equivalent weight of the copolymer coating no greater than 1,150 while the core has an equivalent weight of at least 1,500. Also, a nonuniform ion exchange structure is disclosed in Grot, U.S. Pat. No. 3,784,399 wherein ion exchange groups differ in a film in order to obtain improved electrical efficiency.

A most important utility of the ion exchange membranes in an electrolytic cell such as for electrolysis of brine in production of chlorine and caustic. Specific cells and operating techniques are disclosed in German Patent application No. 2,251,660 published Apr. 26, 1973, Netherlands Patent application No. 72.17598 published June 29, 1973 and Stacey et al. U.S. Pat. No. 3,773,634. In addition, Grot U.S. Pat. No. 3,784,399 sets forth a preferred embodiment of a fluorinated polymer film wherein the ion exchange groups differ on the surfaces of a film in electrolysis of brine.

SUMMARY OF THE INVENTION

The present invention is directed to a composite film for ion exchange purposes wherein two different equivalent weights are employed across the thickness of the film. The film is particularly useful for employment in an electrolytic cell for manufacture of a halogen and an alkali metal hydroxide by electrolysis of an alkali metal halide. Illustratively, the production of chlorine and caustic is most significant from a commercial standpoint.

In the present state of development in the use of ion exchange polymers for production of a halogen and a metal hydroxide, an important criterion is maximization of current efficiency; i.e., maximization of the fraction of the electrical current carried by the metal cations through the membrane, which contributes to a lower electrical energy consumption for the production of a given amount of halogen and metal hydroxide, increases the productivity for desirable products of a given electrolytic cell and reduces the contamination of process streams by undesirable by-products.

The present invention is directed to the improvement in the current efficiency by use of a composite fluorinated ion exchange membrane containing ion exchange sites. A composite film is employed in an electrolytic cell wherein the film to a depth no more than one-third of the thickness contains the fluorinated polymer with an equivalent weight at least 250 greater than the remaining portion of film. The film is positioned in the electrolytic cell whereby the high equivalent weight side faces the cathode section of the cell.

It has been discovered that as the number of active sites in the polymer is reduced, i.e., equivalent weight is increased, the ability of the polymer to absorb electrolyte solutions is reduced to a much greater extent than would be proportionate to the reduction in active sites. The result is that a membrane of high equivalent weight polymer has increased current efficiency in an electrolytic cell but also increased electrical resistance. An increased current efficiency and increased barrier effect to anions can be achieved with a thin layer of the polymer and it is desirable to have only a thin layer to avoid the high electrical resistivity resulting in an excessively high voltage.

DETAILED DESCRIPTION

A need has developed in the production of a halogen and metal hydroxide such as in the chlor-alkali industry for the use of improved ion exchange materials which can replace existing separators which have been used for decades without substantial improvement in design.

In the environment of a chlor-alkali cell, the membrane must be able to withstand a hostile environment for a polymeric material such as exposure to a highly alkaline pH as well as exposure to chlorine. Generally, hydrocarbon ion exchange membranes are totally unsatisfactory for this usage since the membrane cannot withstand this environment.

For commercial usage in the chlor-alkali industry, a film must go beyond the ability to be operable for prolonged time periods in the production of chlorine and caustic. A most important criteria is the current efficiency in conversion of the brine in the electrolytic cell to the desired products. Therefore, improvement in current efficiency can translate into pronounced savings in the cost of production of each unit of chlorine and caustic from the standpoint of reduction in power consumption, reduction in investment and/or reduction in by-products, e.g., oxygen in the chlorine product. Additionally, from a commercial standpoint the cost of production of each unit will be determinative of the commercial suitability of an ion exchange membrane.

The ion exchange polymers of the present disclosure possess pendant side chains containing sulfonyl groups attached to carbon atoms having at least one fluorine atom connected thereto.

The polymers are prepared from monomers which are fluorinated or fluorine substituted vinyl compounds. The polymers are made from at least two monomers with at least one of the monomers coming from each of the two groups described below. The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of use of copolymers in electrolysis of brine, the precursor vinyl monomer desirably will not contain hydrogen.

The second group is the sulfonyl-containing monomers containing the precursor —$SO_2F$ or —$SO_2Cl$. One example of such a comonomer is $CF_2$=$CFSO_2F$. Additional examples can be represented by the general formula $CF_2$=$CFR_fSO_2F$ wherein $R_f$ is a bifunctional perfluorinated radical comprising 2 to 8 carbon atoms. The particular chemical content or structure of the radical linking the sulfonyl group to the copolymer chain is not critical but such must have a fluorine atom attached to the carbon atoms to which is attached the sulfonyl group. If the sulfonyl group is attached directly to the chain, the carbon in the chain to which it is attached must have a fluorine atom attached to it. Other atoms connected to this carbon can include fluorine, chlorine, or hydrogen although generally hydrogen will be excluded in use of the copolymer for ion exchange in a chlor-alkali cell. The $R_f$ radical of the formula above can be either branched or unbranched, i.e., straight-chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are $CF_2=CFOCF_2CF_2SO_2F$,

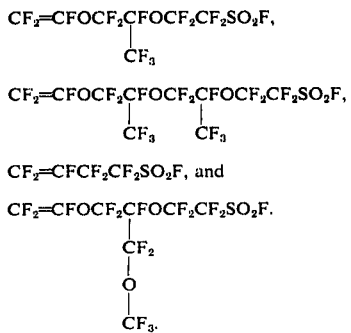

$CF_2=CFCF_2CF_2SO_2F$, and $CF_2=CFOCF_2CFOCF_2CF_2SO_2F.$
$\quad\quad\quad\quad\quad | $
$\quad\quad\quad\quad\ CF_2$
$\quad\quad\quad\quad\ \ |$
$\quad\quad\quad\quad\ \ O$
$\quad\quad\quad\quad\ \ |$
$\quad\quad\quad\quad\ CF_3.$ The most preferred sulfonyl flouride containing comonomer is perfluoro(3,6-dioxa-4-methyl-7-octenesulfonyl fluoride),

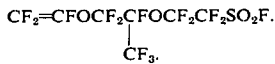

The sulfonyl-containing monomers are disclosed in such references as U.S. Pat. Nos. 3,282,875 to Connolly et al., 3,041,317 to Gibbs et al., and in 3,718,627 to Grot and in 3,560,568 to Resnick.

The preferred copolymers utilized in the film are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably, 25 to 50 percent by weight of the latter.

The copolymer used in the present invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317 issued to H. H. Gibbs and R. H. Griffin on June 26, 1962, that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°–200°C. and at pressures in the range 1–200, or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like.

Aqueous techniques for preparing the copolymer of this invention include contacting the monomers with an aqueous medium containing a free-radical initiator to obtain a slurry of polymer particles in non-water-wet or granular form, as disclosed in U.S. Pat. No. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. Nos. 2,559,752, issued to K. L. Berry on July 10, 1951, and 2,593,583, issued to J. F. Lontz on Apr. 22, 1952.

Upon formation of the intermediate polymer, the pendant sulfonyl groups are present as $-SO_2X$ with X defining fluorine or chlorine and preferably fluorine. It is a requirement in both the intermediate and final fluorinated polymers disclosed herein that the sulfonyl groups are attached to carbon atoms having at least one fluorine atom connected thereto. These carbon atoms serve to link the sulfonyl group to the copolymer chain or alternatively, the carbon atoms form a portion of the backbone chain in the copolymer. After formation of the intermediate polymer, the sulfonyl groups are converted to ionic form.

By use of the term ionic form or an ion exchange site is denoted that the sulfonyl groups will carry a negative charge under the conditions of ion exchange. Included within this definition are sulfonyl groups which will convert to ionic form by splitting off a hydrogen ion (under suitable pH conditions). An example of an ionizable group which will split off a hydrogen ion is a sulfonamido group (e.g., see Resnick and Grot, U.S. Patent application Ser. No. 406,361 filed Nov. 16, 1973).

Other sulfonyl groups in ionic form serving as ion exchange sites will include $-(SO_2NH)_mQ$ wherein Q is selected from the group consisting of H, cation of an alkali metal and cation of an alkaline earth metal and m is the valence of Q or will include $-(SO_3)_nMe$, wherein Me is a metallic cation, H or $NH_4$ and n is the valence of Me. In the above definition, preferred members include cations of alkali metals such as sodium or potassium.

Disclosures of conversion from the intermediate polymer containing $SO_2F$ groups to the final polymer containing ion exchange groups are set forth in U.S. Pat. Nos. 3,282,825 and 3,770,567.

Turning to the specific improvement over the prior art teachings, a composite film is made whereby the fluorinated polymer constitutes no more than one-third of the film thickness at an equivalent weight at least 250 greater than the remaining portion of the film. Equivalent weight is the weight of the polymer in grams containing one equivalent of potential ion exchange capacity.

As the equivalent weight of the polymer increases, the resistance of the polymer increases to a significant extent resulting in high power consumption. Therefore, from this standpoint it is desirable and generally more satisfactory to employ a film with a relatively low equivalent weight. However, due to migration of anions through the film in the production of the metal hydroxide, the current efficiency suffers.

In the present disclosure the migration of anions is reduced by a thin barrier layer or skin of a high equivalent weight on the film surface which is positioned in the electrolytic cell facing the cathode portion of the cell. This layer of high electrical resistivity constitutes a minor portion of the film thickness and thus the penalty in overall resistance is relatively minor. The advantages in use of the barrier layer surpass the disadvantage of the high equivalent weight polymer with its high electrical resistance.

Illustratively, in electrolysis of brine to produce caustic of the same normality, a composite film with a high equivalent weight skin in accordance with the teachings herein gives an improvement in electrical efficiency of 10 to 25 percent in production of chlorine and caustic. This comparison involves use of a film of a uniform equivalent weight polymer as opposed to an equal thickness of film at the same equivalent weight with the exception of a thin high equivalent weight skin substituted for a portion of the lower equivalent weight polymer. Due to high electrical resistance, the results are equally pronounced if the high equivalent weight polymer constitutes the entire thickness of the film.

It is essential in placement of the composite film in the electrolytic cell that the high equivalent weight polymer faces the cathode portion of the cell. Reversal in placement of the film in the electrolytic cell leads to significantly lower electrical efficiencies.

While the high equivalent weight polymer may constitute no more than one-third of the film thickness, most desirably this polymer will comprise no more than one-fifth or one-tenth of the film thickness. Since the high equivalent weight polymer provides barrier properties to the passage of anions from the cathode to the anode portion of the electrolytic cell, the polymer should be present as a continuous layer. Generally, a thickness is desired of 1 mil or less and more desirably 0.5 mil or less. The thickness of the layer may vary dependent upon the equivalent weight employed. The higher the equivalent weight, the greater will be barrier properties to passage of anions. Illustratively, equivalent weights of 2,000 and greater are satisfactory. Since the electrical resistance increases with equivalent weight, it is most desirable to employ as thin a barrier layer as possible to obtain minimum power consumption.

As previously discussed, the difference of equivalent weight of the polymer in the two segments of the composite film is at least 250. A desirable equivalent weight difference is of the order of at least 400.

The major portion of the composite film will be at a low equivalent weight, e.g., of the order of 1,000 or greater. While a low equivalent weight is desirable, polymers with extremely low equivalent weights absorb unduly large amounts of water to the detriment of mechanical properties. From the standpoint of manufacture, a desirable range of equivalent weight is 1,000 to 1,500.

The overall thickness of the film will vary dependent upon the employed ion exchange groups, the equivalent weights of the polymer, the strength of the film necessary, the type and operating conditions of the electrolytic cells, etc. Ordinarily, a lower limit of 3 mils and preferably 4 mils will be employed in the composite film. No upper limit exists on the upper film thickness aside from practical consideration. For example, an increase in electrical resistance results with excessive film thickness. Additionally, excessive polymer weight results in added cost.

It is within the scope of this invention that the ionic groups comprising the film be different. There is no need that the sulfonyl group for ion exchange purposes be the same. Illustratively, the configuration of ion exchange groups disclosed in U.S. Pat. No. 3,784,399 may be employed. In this patent, one surface of the film may have a majority of the sulfonyl groups in the form of $-(SO_2NH)_mQ$ wherein Q is H, $NH_4$, cation of an alkali metal, cation of an alkaline earth metal and combinations thereof and $m$ is the valence of Q, while the other surface has sulfonyl groups in the $-(SO_3)_nMe$ form where Me is a cation and $n$ is the valence of the cation. Also, see U.S. Patent application Ser. No. 406,361 filed Nov. 16, 1973 for other suitable ion exchange groups.

For most applications, it is highly desirable that the film be reinforced to obtain added strength. Suitable reinforcing materials are a fluorinated resin fabric, quartz fabric, glass mat and glass fabric. Encapsulation of support material may be undertaken in the manner disclosed in U.S. Pat. No. 3,770,567 and U.S. Ser. No. 384,497 and now U.S. Pat. No. 3,849,243.

From the standpoint of high electrical efficiency, it is desirable that the encapsulation of the support material be within the low equivalent weight of the polymer. Higher electrical efficiency has been found with encapsulation of the support material in the low equivalent weight polymer in contrast to encapsulation within the high equivalent weight polymer. Additionally, such as in use in an electrolytic cell, the supporting material may break through the encapsulating film through normal wear and tear. In such occurrence, the positioning of the support material generally will not significantly affect the performance of the cell.

As previously discussed, the composite film is particularly useful in production of halogen and metal hydroxide from an alkali or alkaline earth metal. Operating conditions and electrolytic cells may be employed in accordance with prior art teachings, e.g., German Patent application No. 2,251,660, Netherlands Patent application No. 72.17598 and U.S. Pat. No. 3,773,634.

To further disclose the aspects of the invention, the following Examples are provided.

EXAMPLE 1

In this and the following examples, films at specific equivalent weights (EW) were employed from a precursor copolymer of tetrafluoroethylene and

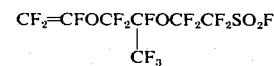

The copolymer was converted to ionic form with the sulfonyl groups in $-SO_3^-Na^+$ form in operation of a chlor-alkali cell.

A composite membrane comprised of ½ mil 1800 EW film and 4 mil 1100 EW film laminated on a layer of Type T-12 Teflon cloth (made by Stern & Stern Textiles, Inc. Hornell, N.Y.) was mounted in a laboratory chlor-alkali cell between two flat metal electrodes. The electrodes used were a stainless steel mesh cathode and a dimensionally stable titanium mesh anode coated with a precious metal oxide. The spacing between the film and each electrode was approximately ⅛ inch.

Through the anode side of the cell was circulated a hot (80°C.) aqueous solution of sodium chloride maintained at a concentration of 12–15 percent by weight. The caustic concentration of the hot (80°C.) catholyte was maintained at about 5–7 Normal through continual addition of water to the catholyte.

Once the cell operating temperature of about 80°C. was reached, a current of about 2 amperes/in$^2$ of membrane was applied to the cell. After three days of continuous operation, the cell efficiency was determined based on the amount of caustic produced versus the amount of electricity passed through the cell. This efficiency was found to be 85.6 percent. The cell voltage was 4.43 volts, and the caustic concentration of the catholyte was 7.1 Normal. Power consumption was 1.775 KwH per pound of chlorine.

EXAMPLE 2 (COMPARATIVE EXAMPLE)

A composite membrane comprised of 5 mil of 1,200 EW film laminated on a layer of T-12cloth was mounted in the laboratory chlor-alkali cell of Example 1. After two days of continuous operation, the cell efficiency was found to be 47.2 percent. The voltage was 3.34 volts, and the caustic concentration was 6.0 Normal.

After five additional days of continuous operation, the cell efficiency was 46.4 percent. The voltage was 3.32 volts and the caustic concentration was 6.8 Normal. These latter figures represent a power consumption of 2.427 KwH per pound of chlorine.

EXAMPLE 3 (COMPARATIVE EXAMPLE)

A composite membrane comprised of 5 mil of 1,100 EW film laminated on a layer of T-12 cloth was mounted in the laboratory chlor-alkali cell of Example 1. After three days of continuous operation, the cell efficiency was found to be 38.6 percent. The cell voltage was 3.32 volts, and the caustic concentration of the catholyte was 5.4 Normal. Power consumption was 2.950 KwH per pound of chlorine.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A composite film of two sections of fluorinated polymer with pendant side chains containing sulfonyl groups, said sulfonyl groups present as ion exchange sites and attached to carbon atoms which have at least one fluorine atom attached thereto; a first section of the polymer constitutes a thickness of not more than one-third of said film at an equivalent weight at least 250 greater than the second section of said film.

2. The film of claim 1 wherein the second section of low equivalent weight portion of the film has an equivalent weight of at least 1,000.

3. The film of claim 2 wherein the first section of high equivalent weight polymer has an equivalent weight of no more than 2,000.

4. The film of claim 1 wherein the first section of high equivalent weight polymer constitutes no more than one-fifth of the film thickness.

5. The film of claim 1 wherein the first section of high equivalent weight polymer constitutes no more than one-tenth of the film thickness.

6. The film of claim 1 wherein the first section of high equivalent weight polymer has a thickness of no more than one mil.

7. The film of claim 1 wherein the first section of high equivalent weight polymer has a thickness of no more than 0.5 mil.

8. The film of claim 1 wherein a reinforcing material is encapsulated within the second section of low equivalent weight polymer.

9. The film of claim 1 wherein the ion exchange sites of the high and low equivalent weight portions of the polymer are the same.

10. The film of claim 1 wherein the ion exchange sites of the high and low equivalent weight portions of the polymer are different.

11. In a process of production of halogen and alkali metal hydroxide by electrolysis of an alkali metal halide employing separate anode and cathode sections in an electrolytic cell, the improvement comprising passing ions of said metal through a composite film of two sections of a fluorinated polymer with pendant side chains containing sulfonyl groups, said sulfonyl groups present as ion exchange sites and attached to carbon atoms which have at least one fluorine atom attached thereto with a first section of the polymer constitutes a thickness of not more than one-third of said film at an equivalent weight at least 250 greater than the second section of said film, said film positioned in the cell with the high equivalent weight polymer facing the cathode section.

12. The process of claim 11 wherein said ions pass through a composite film wherein the first section of high equivalent weight polymer constitutes no more than one-fifth of the film thickness.

13. The process of claim 11 wherein said ions pass through a composite film wherein the first section of high equivalent weight polymer constitutes no more than one-tenth of the film thickness.

14. An electrolytic cell comprising a housing with separate anode and cathode sections, said cell separated by a composite film of fluorinated polymer with pendant side chains containing sulfonyl groups said sulfonyl groups present as ion exchange sites and attached to carbon atoms which have at least one fluorine atom attached thereto with a first section of the polymer constitutes a thickness of not more than one-third of said film has an equivalent weight at least 250 greater than the remaining thickness of said film, said film positioned in the cell with the high equivalent weight polymer facing the cathode section.

15. The cell of claim 14 wherein the first section of high equivalent weight polymer constitutes no more than one-fifth of the film thickness.

16. The cell of claim 15 wherein the first section of high equivalent weight polymer constitutes no more than one-tenth of the film thickness.

* * * * *